F. T. HOEYNCK.
VEGETABLE GRATER.
APPLICATION FILED MAR. 26, 1912.

1,051,499.

Patented Jan. 28, 1913.
2 SHEETS—SHEET 1.

Witnesses

Inventor
F. T. Hoeynck
By C. L. Parker
Attorney

F. T. HOEYNCK.
VEGETABLE GRATER.
APPLICATION FILED MAR. 26, 1912.
1,051,499.
Patented Jan. 28, 1913.
2 SHEETS—SHEET 2.
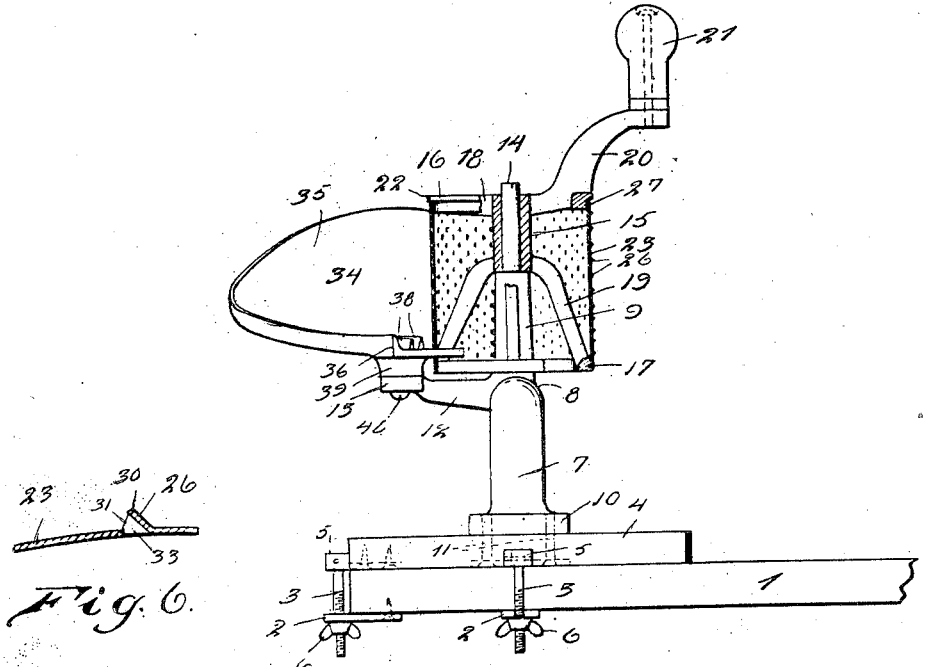
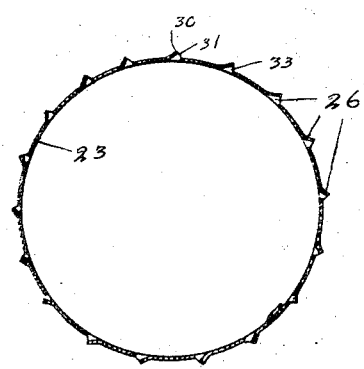
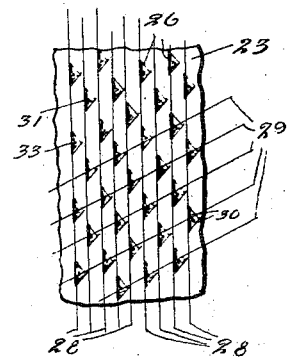
Inventor
F. T. Hoeynck
Witnesses
By C. L. Parker
Attorney

UNITED STATES PATENT OFFICE.

FREDERICK T. HOEYNCK, OF CHICAGO, ILLINOIS.

VEGETABLE-GRATER.

1,051,499.

Specification of Letters Patent. Patented Jan. 28, 1913.

Application filed March 26, 1912. Serial No. 686,261.

*To all whom it may concern:*

Be it known that I, FREDERICK T. HOEYNCK, a citizen of the United States, residing at Chicago, in the county of Cook and State of Illinois, have invented certain new and useful Improvements in Vegetable-Graters, of which the following is a specification.

The present invention relates to a vegetable grater wherein a rotatable grating cylinder is employed to cut the vegetable.

An important object of my invention is to provide a device of the above mentioned character, which is highly efficient in fulfilling its function, thus saving both time and labor.

A further object of this invention is to provide a novel form and arrangement of the grating teeth of the grating cylinder, whereby such teeth will grate the vegetable in a more thorough and expeditious manner than has heretofore been accomplished.

A further object of my invention is to provide novel means to properly guide the vegetable in its feeding movement toward the grating cylinder.

A further object of this invention is to provide a device of the above mentioned character, formed of few and simple parts, which may be readily separated for the purpose of cleaning and subsequently assembled.

A further object of my invention is to provide a vegetable grater which is simple in construction, strong, durable, and neat in appearance.

Other objects and advantages of the invention will be apparent during the course of the following description.

Figure 1:
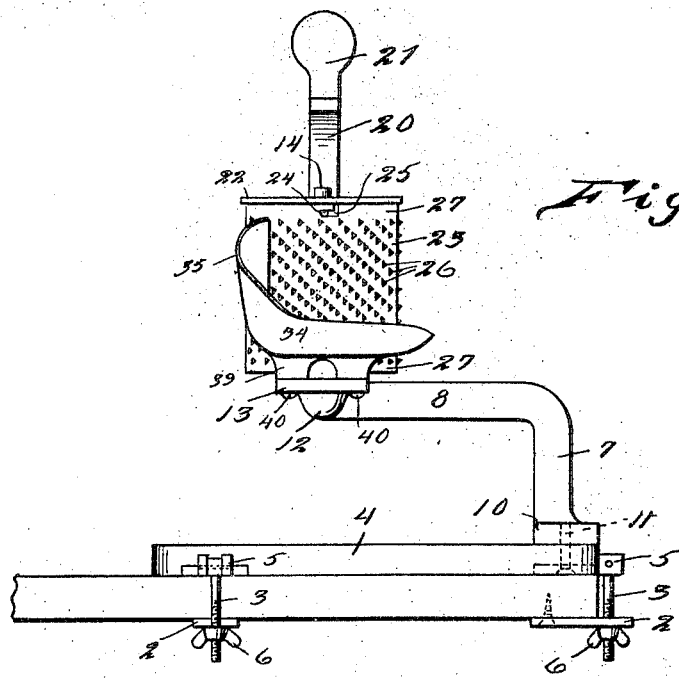
Figure 2:
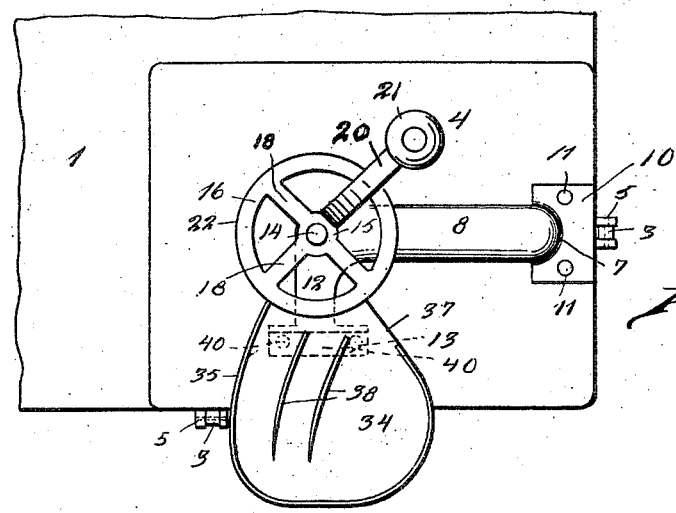

In the accompanying drawings forming a part of this specification and in which like numerals are employed to designate like parts throughout the same, Figure 1 is a side view of the device, Fig. 2 is a plan view of the same, Fig. 3 is a side view taken at right angles to Fig. 1 and showing the grating cylinder in section, Fig. 4 is a horizontal sectional view taken through the grating cylinder, Fig. 5 is an enlarged fragmentary side view of a portion of the grating cylinder, and, Fig. 6 is a still more enlarged detail section through one of the teeth.

In the drawings wherein for the purpose of illustration. I have shown a preferred embodiment of my invention, the numeral 1 designates the top of a table; to the lower surface of which are pivotally secured forked strips 2, for receiving the lower portions of swinging bolts 3, having pivotal connection at their upper end with a base 4, as shown at 5. These bolts 3 carry clamping or thumb nuts 6. Disposed upon the base 4 is a supporting arm, comprising lower vertical, intermediate horizontal, and upper vertical portions 7, 8 and 9, respectively. The lower vertical portion 7 is provided with a foot or base 10, which is rigidly connected with the base 4 by means of screw 11 or the like. The intermediate horizontal portion 8 of the supporting arm is disposed at a right angle to the lower vertical portion 7 and is spaced from the base 4, to allow of the placing of a pan or other receptacle upon the base, to collect the grated material. Formed upon the outer end of the intermediate horizontal portion 8 adjacent the lower end of the upper vertical portion 9 is a horizontal extension 12, disposed at a right angle to said intermediate portion 8. This horizontal extension 12 is provided with a head 13. The supporting arm including the portions 7, 8 and 9 and the horizontal extension 12 are preferably made in a single casting.

Rigidly connected with the upper and of the upper vertical portion 9 of the supporting arm is a vertical axle or shaft 14 upon which is rotatably mounted a hub 15 of an open frame. This open frame comprises upper and lower rings 16 and 17, connected with the hub 15 through the medium of radially disposed arms or spokes 18 and 19, respectively. Formed upon one of the arms or spokes 18 is an upwardly extending crank arm 20, upon the free end of which is rotatably mounted a handle 21. The frame including the rings and radially disposed arms and spokes and the crank arm 20 are preferably formed in a single casting. This integral frame is prevented from moving downwardly by its engagement with the upper vertical portion 9 and the same is free to be removed from the shaft 14 by a vertical movement.

The upper ring 16 is provided with an outwardly extending annular flange 22, to be engaged by a grating cylinder 23, which surrounds the frame and has its lower end in engagement with the lower ring 17 included in such frame. Formed upon the upper ring 16 is a locking lug 24, to operate within a bayonet slot 25 formed in the upper end of the grating cylinder 23, as shown. It is thus seen that the grating cylinder 23 is securely held in place upon its inner frame and may be readily removed therefrom for the purpose of cleaning or the like and subsequently returned to its operative position.

The cylinder 23 is provided throughout the greater portion of its length with teeth 26. Attention is called to the fact that the extreme upper and lower portions 27 of the cylinder are not provided with teeth but remain smooth to form margins. The teeth 26 are disposed in vertical rows on lines 28 and such teeth are also arranged in rows of inclined lines 29, which are disposed at substantially twenty-six and one-half degrees to the horizontal, as shown. These rows of teeth are suitably spaced, as shown. The teeth 26 all face in the same direction and the cylinder 23 is turned for cutting in that direction only. Each tooth, as more clearly shown in Fig. 6, comprises outwardly extending triangular portions 30, having their forward or cutting edges 31 sharpened or beveled. By constructing and arranging the teeth as hereinabove described, I have found that the grating cylinder will cut the material much more quickly and with greater ease to the operator than has heretofore been accomplished.

The numeral 34 designates a guide bowl or receptacle having preferably the shape, as shown. This bowl comprises an upstanding side 35 which tapers toward the opposite end of the bowl and terminates, as shown at 36. The bowl 34 has a cut-out portion or opening 37, to permit of the cut material being removed from within the bowl. Formed upon the horizontal or bottom wall of the bowl 34 are upstanding curved guide ribs or tracks 38, which are disposed at a tangent with relation to the cylinder 23. These guide ribs serve to properly conduct the vegetable in its travel toward the cylinder 23. Formed upon the lower face of the bowl 34 is a depending boss 39, which is rigidly connected with the horizontal extension 12 by means of screws 40 or the like.

The operation of the device is as follows:—A potato or other vegetable is placed in the bowl 34 upon and between the guide ribs 38 and moved into engagement with the grating cylinder 23, which is now being turned in the proper direction. The operator turns the handle 21 with the right hand and feeds the potato to the cylinder with the other hand. The teeth 26 will cut the potato in threads which will pass through the openings 33 and be collected in the pan or other receptacle placed upon the base 4. The other particles of potato that do not pass into the interior of the cylinder 23 will be collected in the bowl 34 and may be readily removed therefrom. The cylinder 23 may be quickly and easily removed from and replaced upon its frame. The frame including the hub 15 may be quickly removed from and replaced upon the shaft 14.

It is to be understood that the form of my invention herewith shown and described is to be taken as a preferred example of the same and that various changes in the shape, size, and arrangement of parts may be resorted to without departing from the spirit of the invention or the scope of the subjoined claim.

Having thus described my invention, I claim:—

A vegetable grater consisting of a support, a vertical spindle projecting upwardly from said support, a cylindrical grater rotatively mounted upon said spindle, said support being provided with a laterally projecting arm, a feed bowl mounted upon said arm and projecting radially toward said grater, said bowl having the inner edge of its bottom conforming to the curvature of said grater and said bowl being provided with a discharge opening disposed tangentially relatively to said cylindrical grater and with an elevated wall disposed opposite to said discharge opening.

In testimony whereof I affix my signature in presence of two witnesses.

FREDERICK T. HOEYNCK.

Witnesses:
J. P. REULAND,
FRED H. HOEYNCK.